US012425478B2

(12) United States Patent
Wang

(10) Patent No.: US 12,425,478 B2
(45) Date of Patent: Sep. 23, 2025

(54) COMMUNICATION METHOD AND APPARATUS, AND RELATED DEVICE

(71) Applicant: AUTEL INTELLIGENT TECHNOLOGY CORP., LTD., Guangdong (CN)

(72) Inventor: Weilin Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 1154 days.

(21) Appl. No.: 17/143,593

(22) Filed: Jan. 7, 2021

(65) Prior Publication Data
US 2021/0126973 A1     Apr. 29, 2021

Related U.S. Application Data

(63) Continuation of application No. PCT/CN2019/111920, filed on Oct. 18, 2019.

(30) Foreign Application Priority Data
Oct. 31, 2018  (CN) .......................... 201811286400.8

(51) Int. Cl.
*H04L 67/12*     (2022.01)
*G05B 23/02*     (2006.01)
(Continued)

(52) U.S. Cl.
CPC .......... *H04L 67/12* (2013.01); *G05B 23/0213* (2013.01); *G07C 5/008* (2013.01); *G07C 5/0808* (2013.01); *G07C 2205/02* (2013.01)

(58) Field of Classification Search
CPC ......... H04L 67/12; H04L 69/14; H04L 69/18; G05B 23/0213; G05B 19/0425; G07C 5/008; G07C 5/0808; G07C 2205/02
(Continued)

(56) References Cited

U.S. PATENT DOCUMENTS 9,684,500 B2 *   6/2017   Margol .................. G07C 5/008
2012/0044527 A1 * 2/2012   Panko .................. G07C 5/0808
                                                         358/1.15
(Continued)

FOREIGN PATENT DOCUMENTS

CN      101663853 A   *   3/2010   ............... H04L 1/24
CN      102098326 A       6/2011
(Continued)

OTHER PUBLICATIONS

The International Search Report mailed Jan. 14, 2020; PCT/CN2019/111920.

*Primary Examiner* — Brodie J Follman
(74) *Attorney, Agent, or Firm* — Frank Gao, Esq.

(57) ABSTRACT

The embodiments of the present invention relate to the field of vehicle diagnosis technologies, and specifically disclose a communication method and apparatus, and a related device. The method includes: forming a first communication link or a second communication link between a vehicle diagnosis device and a communication device based on connection by using a physical interface; determining, by the vehicle diagnosis device after the first communication link is formed between the vehicle diagnosis device and the communication device, whether the first communication link needs to be switched to the second communication link; if the first communication link needs to be switched to the second communication link, sending a communication mode switching instruction to the communication device by using the first communication link, to enable the communication device to switch a first communication mode of the communication device to a second communication mode; and subsequently switching, by the vehicle diagnosis device, the first communication mode to the second communication mod, to establish the second communication link with the communication device. The embodiments of the present (Continued)

invention can simplify a hardware device, improve the design efficiency and reduce production costs by using the foregoing technical solutions.

5 Claims, 5 Drawing Sheets

(51) Int. Cl.
  *G07C 5/00* (2006.01)
  *G07C 5/08* (2006.01)
(58) Field of Classification Search
  USPC .......................................................... 701/31
  See application file for complete search history.

(56) References Cited

U.S. PATENT DOCUMENTS

| 2012/0277949 | A1* | 11/2012 | Ghimire | ............. | G05B 23/0275 |
| | | | | | 701/31.7 |
| 2014/0115202 | A1* | 4/2014 | Yoshinaga | ............ | G06F 13/426 |
| | | | | | 710/62 |
| 2016/0066127 | A1* | 3/2016 | Choi | .................... | H04W 12/37 |
| | | | | | 455/41.2 |
| 2017/0187567 | A1* | 6/2017 | Oda | ..................... | G07C 5/0808 |
| 2017/0324817 | A1* | 11/2017 | Oliveira | ................. | H04L 67/10 |
| 2019/0098602 | A1* | 3/2019 | Costa | ................. | H04W 64/003 |

FOREIGN PATENT DOCUMENTS

| CN | 102780725 | A | | 11/2012 | | |
| CN | 109347965 | A | * | 2/2019 | ......... | G05B 19/0425 |
| KR | 20111 0103648 | A | * | 9/2011 | | |

\* cited by examiner

COMMUNICATION METHOD AND APPARATUS, AND RELATED DEVICE

This application is a continuation of International Patent Application No. PCT/CN2019/111920 filed on Oct. 18, 2019, which claims priority to Chinese Patent Application No. 201811286400.8 filed on Oct. 31, 2018, both of which are incorporated by reference herein in their entireties.

BACKGROUND

Technical Field

The present application relates to the field of vehicle diagnosis technologies, and in particular, to a communication method and apparatus, and a related device.

RELATED ART

Communication protocols supported by an electronic control unit (ECU) of a vehicle generally include: Controller Area Network (CAN), Pulse Width Modulation (PWM), Keyword Protocol 2000 (KWP2000), Variable Pulse Width (VPW), Internet Protocol (IP) and the like. However, a vehicle diagnosis device usually has universal serial bus (USB), wireless fidelity (WIFI), BitTorrent (BT) and other physical interfaces, and does not have a physical interface and a protocol that directly communicate with the ECU of the vehicle. Therefore, when the ECU of the vehicle is diagnosed by using the vehicle diagnosis device, a communication device (also referred to as a lower computer) usually needs to be added between the vehicle diagnosis device and the ECU of the vehicle to implement establishment of a communication link and protocol conversion. Specifically, the communication device may establish a communication connection to the vehicle diagnosis device by using USB, WIFI, BT and other physical interfaces, and at the same time, the communication device may also communicate with the ECU of the vehicle by using CAN, PWM, KWP2000, VPW, IP and other protocols to establish a communication link between the vehicle diagnosis device and the ECU of the vehicle.

Generally, the existing vehicle diagnosis device establishes USB, WIFI, BT and other communication links with the communication device by using USB, WIFI, BT and other physical interfaces, and establishes an IP communication link with the communication device by adding an Ethernet physical interface.

However, the communication links are not necessarily concurrent. A plurality of communication links respectively formed by a plurality of physical interfaces often cause waste of the communication links, and it needs more hardware resources and occupies more structural spaces to integrate the plurality of physical interfaces on the vehicle diagnosis device at the same time.

Therefore, how to reduce the quantity of the physical interfaces while meeting a requirement of communication between the vehicle diagnosis device and the communication device is a problem that needs to be resolved urgently at present.

SUMMARY

In view of this, embodiments of the present invention provide a communication method and apparatus, and a related device, so that two different communication links can be formed between a vehicle diagnosis device and a communication device based on a single physical connection manner, thereby simplifying a hardware device and improving design efficiency.

To resolve the foregoing technical problem, the embodiments of the present invention provide the following technical solutions:

According to a first aspect, an embodiment of the present invention provides a communication method, applied to a vehicle diagnosis device, where the vehicle diagnosis device is connected to a communication device by using a physical interface, the vehicle diagnosis device and the communication device each including a first communication mode and a second communication mode, and the method includes:

forming, based on the connection between the physical interface and the communication device, a first communication link in the first communication mode or a second communication link in the second communication mode with the communication device;

determining, after the first communication link is formed between the vehicle diagnosis device and the communication device, whether the first communication link needs to be switched to the second communication link;

if the first communication link needs to be switched to the second communication link, sending a communication mode switching instruction to the communication device by using the first communication link, to enable the communication device to switch the first communication mode of the communication device to the second communication mode; and switching the first communication mode to the second communication mode to establish the second communication link with the communication device.

Optionally, the determining whether the first communication link needs to be switched to the second communication link includes:

determining, according to a data volume of to-be-transmitted data, whether the first communication link needs to be switched to the second communication link.

Optionally, the determining whether the first communication link needs to be switched to the second communication link includes:

determining, according to an executed diagnosis function, whether the first communication link needs to be switched to the second communication link.

Optionally, the switching the first communication mode to the second communication mode includes:

switching the first communication mode to the second communication mode after it is detected that the first communication link is disconnected.

Optionally, the method further includes:

establishing the second communication link with the communication device by using a drive module corresponding to the second communication mode.

Optionally, after the vehicle diagnosis device establishes the second communication link with the communication device, the method further includes:

monitoring the second communication link; and switching the second communication mode to the first communication mode after it is detected that the second communication link is disconnected.

According to a second aspect, an embodiment of the present invention provides another communication method, applied to a communication device, where the communication device is connected to a vehicle diagnosis device by using a physical interface, the communication device and the vehicle diagnosis device each including a first communication mode and a second communication mode, and the method includes:

forming, based on the connection between the physical interface and the vehicle diagnosis device, a first communication link in the first communication mode or a second communication link in the second communication mode with the vehicle diagnosis device; and after the first communication link is formed between the communication device and the vehicle diagnosis device, if a communication mode switching instruction sent by the vehicle diagnosis device is received by using the first communication link, switching the first communication mode to the second communication mode to establish the second communication link with the vehicle diagnosis device.

Optionally, the method further includes:

establishing the second communication link with the vehicle diagnosis device by using a drive module corresponding to the second communication mode.

According to a third aspect, an embodiment of the present invention provides a communication apparatus, applied to a vehicle diagnosis device, where the vehicle diagnosis device is connected to a communication device by using a physical interface, the vehicle diagnosis device and the communication device each including a first communication mode and a second communication mode, and the apparatus includes: a first communication unit, a determining unit, an instruction sending unit and a first switching unit;

the first communication unit is configured to form, based on the connection between the physical interface and the communication device, a first communication link in the first communication mode or a second communication link in the second communication mode with the communication device;

the determining unit is configured to determine, after the first communication link is formed between the vehicle diagnosis device and the communication device, whether the first communication link needs to be switched to the second communication link;

the instruction sending unit is configured to send a communication mode switching instruction to the communication device by using the first communication link when the determining unit determines that the first communication link needs to be switched to the second communication link, to enable the communication device to switch the first communication mode of the communication device to the second communication mode; and the first switching unit is configured to switch the first communication mode to the second communication mode after the instruction sending unit sends the communication mode switching instruction to the communication device by using the first communication link, to establish the second communication link with the communication device.

Optionally, the determining unit is specifically configured to:

determine, according to a data volume of to-be-transmitted data, whether the first communication link needs to be switched to the second communication link.

Optionally, the determining unit is specifically configured to:

determine, according to an executed diagnosis function, whether the first communication link needs to be switched to the second communication link.

Optionally, the first switching unit is specifically configured to:

switch the first communication mode to the second communication mode after it is detected that the first communication link is disconnected.

Optionally, the apparatus further includes:

a first drive unit, configured to establish the second communication link with the communication device by using a drive module corresponding to the second communication mode.

Optionally, the apparatus further includes a monitoring unit, the monitoring unit being configured to monitor the second communication link; and the first switching unit is further configured to: switch the second communication mode to the first communication mode after the monitoring unit detects that the second communication link is disconnected.

According to a fourth aspect, an embodiment of the present invention provides a communication apparatus, applied to a communication device, where the communication device is connected to a vehicle diagnosis device by using a physical interface, the communication device and the vehicle diagnosis device each including a first communication mode and a second communication mode, and the apparatus includes a second communication unit, an instruction receiving unit and a second switching unit;

the second communication unit is configured to form, based on the connection between the physical interface and the vehicle diagnosis device, a first communication link in the first communication mode or a second communication link in the second communication mode with the vehicle diagnosis device;

the instruction receiving unit is configured to receive, by using the first communication link, after the first communication link is formed between the communication device and the vehicle diagnosis device, a communication mode switching instruction sent by the vehicle diagnosis device; and the second switching unit is configured to switch the first communication mode to the second communication mode when the instruction receiving unit receives the communication mode switching instruction, to establish the second communication link with the vehicle diagnosis device.

Optionally, the apparatus further includes:

a second drive unit, configured to establish the second communication link with the vehicle diagnosis device by using a drive module corresponding to the second communication mode.

According to a fifth aspect, an embodiment of the present invention provides a vehicle diagnosis device, including:

a physical interface;

at least one processor connected to the physical interface; and a memory communicatively connected to the at least one processor, the memory storing instructions executable by the at least one processor, the instructions being executed by the at least one processor, to enable the at least one processor to perform the communication method described above.

According to a sixth aspect, an embodiment of the present invention provides a communication device, including:

a physical interface;

at least one processor connected to the physical interface; and a memory communicatively connected to the at least one processor, the memory storing instructions executable by the at least one processor, the instructions being executed by the at least one processor, to enable the at least one processor to perform the communication method described above.

According to a seventh aspect, an embodiment of the present invention provides a non-transitory computer-readable storage medium, the non-transitory computer-readable storage medium storing computer executable instructions, and the computer executable instructions being configured to enable the vehicle diagnosis device to perform the communication method described above.

According to an eighth aspect, an embodiment of the present invention provides another non-transitory computer-readable storage medium, the non-transitory computer-readable storage medium storing computer executable instructions, and the computer executable instructions being configured to enable the communication device to perform the communication method described above.

The embodiments of the present invention have the following beneficial effects: different from the prior art, according to the communication method and apparatus, and the related device provided in the embodiments of the present invention, a vehicle diagnosis device and a communication device are each provided with a first communication mode and a second communication mode; when the vehicle diagnosis device and the communication device are both in the first communication mode, a first communication link can be formed based on connection between the vehicle diagnosis device and the communication device by using a physical interface; when the vehicle diagnosis device and the communication device are both in the second communication mode, a second communication link can be formed based on connection by using the same physical interface; and whether the communication is performed by using the first communication link or the second communication link can be determined according to a requirement; two communication links having different logics can be formed between the vehicle diagnosis device and the communication device based on a single physical connection manner, thereby reducing the quantity of physical interfaces, simplifying a hardware device, improving design efficiency and reducing production costs while meeting a requirement of communication between the vehicle diagnosis device and the communication device.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following descriptions are merely some embodiments of the present invention, and a person of ordinary skill in the art may further obtain other accompanying drawings according to the accompanying drawings without creative efforts.

DETAILED DESCRIPTION

Figure 1:
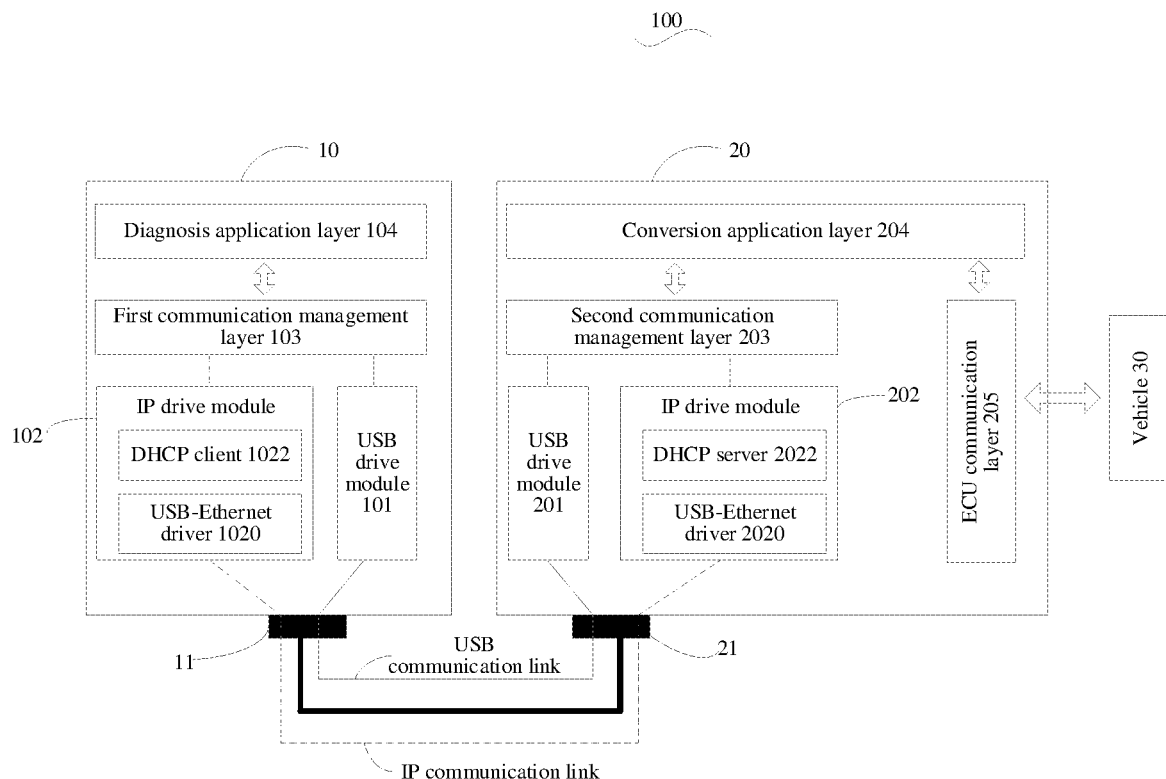
FIG. 1 is a schematic structural diagram of a vehicle diagnosis system according to an embodiment of the present invention.

To make the objectives, technical solutions, and advantages of the present invention clearer and more comprehensible, the following further describes the present invention in detail with reference to the accompanying drawings and embodiments. It should be understood that the embodiments herein are provided for describing the present invention and not intended to limit the present invention.

It should be noted that, if no conflict occurs, features in the embodiments of the present invention may be combined with each other and fall within the protection scope of the present invention. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart. Further, terms such as "first", "second", or the like used in the present invention do not limit data or an execution order, but are only used to distinguish the same objects or similar objects whose functions and purposes are basically the same.

The embodiments of the present invention provide a communication method and apparatus, and a related device applied between a vehicle diagnosis device and a communication device.

The communication method is a method for forming two or more communication links having different logics (for example, a USB communication link and an IP communication link) between the vehicle diagnosis device and the communication device based on a single physical connection manner (for example, USB connection), and can meet a requirement of communication between the vehicle diagnosis device and the communication device (for example, transmission of a simple instruction, a message and other conventional communication data having a smaller data volume by using the USB communication link, and transmission of ECU coding, programming and other function data having a larger data volume by using the IP communication link) while reducing the quantity of physical interfaces, thereby simplifying a hardware device, improving design efficiency and reducing production costs. In the embodiments of the present invention, the "communication link" is a logical communication link built by using software modules of both the vehicle diagnosis device and the communication device. Different communication links correspond to different communication methods/protocols.

The communication apparatus is a virtual apparatus composed of software programs that can implement the communication method provided in the embodiments of the present invention. The communication apparatus and the communication method provided in the embodiments of the present invention are based on the same inventive concept, and have the same technical features and beneficial effects.

The related device includes the vehicle diagnosis device and the communication device. The vehicle diagnosis device and the communication device may run a related apparatus and/or software program that can implement the communication method provided in the embodiments of the present invention.

The following further describes the embodiments of the present invention with reference to the accompanying drawings. It should be understood that the following embodiments provided in the present invention may be combined with each other to form new implementations, provided that the embodiments are do no conflict with each other.

Embodiment 1

FIG. 1 is a schematic structural diagram of a vehicle diagnosis system according to an embodiment of the present invention. The vehicle diagnosis system 100 may be used as one of the application environments of the communication method provided in the embodiments of the present invention.

Specifically, referring to FIG. 1, the vehicle diagnosis system 100 includes a vehicle diagnosis device 10, a communication device 20 and a vehicle 30. The communication device 20 is communicatively connected to the vehicle diagnosis device 10 and the vehicle 30, so that the vehicle diagnosis device 10 may send instructions/data to the vehicle 30 by using the communication device 20, and/or, receive parameters/data returned by the vehicle 30, to implement diagnosis on the vehicle 30.

The vehicle diagnosis device 10 may be any type of electronic device capable of diagnosing the vehicle 30. For example, it may be specifically a tablet computer for the diagnosis, the tablet computer being installed with related diagnosis software for diagnosing the vehicle 30.

The vehicle diagnosis device 10 includes at least one first physical interface 11 in hardware. The first physical interface 11 may be specifically a common physical interface such as a USB interface or a Lightning interface. A physical connection (or a physical communication link) may be established with the communication device 20 by using the first physical interface 11, thereby implementing communication with the communication device 20.

Specifically, corresponding to the physical connection established by the first physical interface 11, the vehicle diagnosis device 10 may set two or more different communication modes on a software logical level, each communication mode corresponding to one drive module. Communication methods/protocols having different logics may be formed by driving the first physical interface 11 by different drive modules.

For example, in this embodiment, the first physical interface 11 may be a USB interface. Corresponding to the USB interface, the vehicle diagnosis device 10 may be provided with a USB communication mode (or referred to as a first communication mode) and an IP communication mode (or referred to as a second communication mode). In the USB communication mode, the first physical interface 11 may be driven by using a USB drive module 101. The USB drive module 101 may include any driver that can establish a USB transmission protocol, for example, a Passthru USB driver. In the IP communication mode, the first physical interface 11 may be driven by using an IP drive module 102. The IP drive module 102 may be any driver that can implement an IP transmission protocol, and may specifically include a USB-Ethernet driver 1020 and a DHCP client 1022. The USB-Ethernet driver 1020 is configured to encapsulate and decapsulate an IP data packet from the first physical interface 11, and the DHCP client 1022 is configured to obtain an IP address from the communication device 20 in the IP communication mode.

In addition, the vehicle diagnosis device 10 may further include a first communication management layer 103 and a diagnosis application layer 104 on a software level. The first communication management layer 103 is configured to manage a status of the foregoing communication mode, monitor a change of a status of a communication link between the vehicle diagnosis device 10 and the communication device 20, provide a standardized data transceiver interface for the diagnosis application layer 104 and encapsulate and/or decapsulate data based on a current communication mode. The diagnosis application layer 104 is configured to perform a specific diagnosis service and/or interact with a user, which may be specifically implemented by using vehicle diagnosis software.

The communication device 20 may be any type of communication box (or referred to as a lower computer). For example, the communication device 20 may be but is not limited to a vehicle communication interface (VCI) or an on-board diagnostic (OBD), which is configured to perform protocol conversion to build a communication link between the vehicle diagnosis device 10 and the vehicle 30.

The communication device 20 also includes, in hardware, at least one second physical interface 21 configured to establish physical connection to the vehicle diagnosis device. The second physical interface 21 corresponds to the first physical interface 11, and may be the same type of interface as the first physical interface 11.

Similarly, corresponding to the physical connection established by the second physical interface 21, the communication device 20 may also include two or more different communication modes on a software logical level, each communication mode corresponding to a drive module. Communication methods/protocols having different logics may be formed by driving the second physical interface 21 by different drive modules. In addition, when a communication mode selected by the communication device 20 is consistent with a communication mode selected by the vehicle diagnosis device 10, a corresponding communication link may be formed; when a communication mode selected by the communication device 20 is different from a communication mode selected by the vehicle diagnosis device 10, a communication link cannot be formed between the vehicle diagnosis device 10 and the communication device 20.

For example, in this embodiment, the second physical interface 21 is specifically a USB interface. The communication device 20 is also provided with a USB communication mode (or referred to as a first communication mode) and an IP communication mode (or referred to as a second communication mode). Similarly, for the communication device 20, in the USB communication mode, the second physical interface 21 may be driven by using a USB drive module 201. The USB drive module 201 may include any driver that can establish a USB transmission protocol, for example, a Passthru USB driver. In the IP communication mode, the second physical interface 21 may be driven by using an IP drive module 202. The IP drive module 202 may be any driver that can implement an IP transmission protocol, and may specifically include a USB-Ethernet driver 2020 and a DHCP server 2022. The USB-Ethernet driver 2020 is configured to encapsulate and decapsulate an IP data packet from the second physical interface 21, and the DHCP server 2022 is configured to allocate an IP address for the vehicle diagnosis device 10 in the IP communication mode.

When the vehicle diagnosis device 10 and the communication device 20 are both in the USB communication mode (or the vehicle diagnosis device 10 and the communication device 20 are both in the first communication mode), a USB communication link (or referred to as a first communication link) may be formed between the vehicle diagnosis device 10 and the communication device 20; when the vehicle diagnosis device 10 and the communication device 20 are both in the IP communication mode (or the vehicle diagnosis device 10 and the communication device 20 are both in the second communication mode), an IP communication link (or referred to as a second communication link) may be formed between the vehicle diagnosis device 10 and the communication device 20.

In addition, the communication device 20 may further include a second communication management layer 203, a conversion application layer 204 and an ECU communication layer 205 on a software level. The second communication management layer 203 is configured to perform switching and status management of the communication mode, provide a standardized data transceiver interface for the conversion application layer 204 and encapsulate and/or decapsulate data based on a current communication mode. The conversion application layer 204 is configured to perform command format/protocol conversion and relay transmission of data packets. The ECU communication layer 205 is configured to send a converted command/data packet to the vehicle 30, and may specifically include an interface and a driver configured to communicate with the vehicle 30, for example, CAN, PWM, KWP2000, VPW, or IP.

The vehicle 30 may be any type of transportation, such as a car, a bus or a heavy-duty truck. The vehicle 30 is provided with an electronic control unit (that is, ECU), the ECU recording all data/parameters of the vehicle 30. The vehicle 30 may be diagnosed by obtain data in the ECU. Therefore, the communication device 20 essentially establishes a communication link with the ECU of the vehicle 30.

Based on the foregoing vehicle diagnosis system 100, in actual application, the first physical interface 11 may be first connected to the second physical interface 21 by using a USB cable, thereby establishing physical connection between the vehicle diagnosis device 10 and the communication device 20, and establishing communication connection between the communication device 20 and the ECU in the vehicle 30. For example, communication between the communication device 20 and the vehicle 30 is implemented by using an OBD interface. Then the USB communication link or the IP communication link is built between the vehicle diagnosis device 10 and the communication device 20.

When the vehicle diagnosis device 10 sends data to the vehicle 30, the vehicle diagnosis device 10 may send data to the communication device 20 by using the USB communication link or the IP communication link. After obtaining the data sent by the vehicle diagnosis device 10, the communication device 20 may perform protocol conversion on the received data in the conversion application layer 204 according to the communication protocol between the communication device 20 and the vehicle 30, thereby sending the converted data packet to the vehicle 30 by using the ECU communication layer 205. Similarly, when the vehicle 30 returns data to the vehicle diagnosis device 10, the data is also first transmitted to the communication device 20. The communication device 20 performs protocol conversion on the received data based on a current mode of communication between the communication device 20 and the vehicle diagnosis device 10, thereby returning the converted data to the vehicle diagnosis device 10 by using a currently-formed communication link.

If the communication link formed between the vehicle diagnosis device 10 and the communication device 20 is the USB communication link, data transmission is performed according to a USB protocol. Specifically, the first communication management layer 103 encapsulates to-be-transmitted data into USB data, and then transmits the USB data to the second communication management layer 203 by using the USB communication link, and the second communication management layer 203 parses the received data based on the USB protocol, and then sends the parsed data to the conversion application layer 204. Alternatively, the second communication management layer 203 encapsulates the to-be-transmitted data into the USB data, and then transmits the USB data to the first communication management layer 103 by using the USB communication link, and the first communication management layer 103 parses the received data based on the USB protocol, and then sends the parsed data to the diagnosis application layer 104.

If the communication link formed between the vehicle diagnosis device 10 and the communication device 20 is the IP communication link, data transmission is performed according to the IP protocol. Specifically, the first communication management layer 103 encapsulates to-be-transmitted data into IP data, and then transmits the IP data to the second communication management layer 203 by using the IP communication link, and the second communication management layer 203 parses the received data based on the IP protocol, and then sends the parsed data to the conversion application layer 204. Alternatively, the second communication management layer 203 encapsulates the to-be-transmitted data into the IP data, and then transmits the IP data to the first communication management layer 103 by using the IP communication link, and the first communication management layer 103 parses the received data based on the IP protocol, and then sends the parsed data to the diagnosis application layer 104.

In addition, in this embodiment, in a process of data transmission, the communication link may further be switched according to a requirement. For example, the USB communication link is switched to the IP communication link, or the IP communication link is switched to the USB communication link. A specific implementation thereof is described in detail in a subsequent embodiment.

It can be learned that, in this embodiment, both the vehicle diagnosis device 10 and the communication device 20 only need to include one physical interface (the first physical interface 11 and the second physical interface 21 respectively) in hardware, to form two or more communication links having different logics between the vehicle diagnosis device 10 and the communication device 20, so that two or more different communication manners are implemented, thereby simplifying a hardware device, improving the design efficiency and reducing production costs.

In addition, it should be noted that the communication method and apparatus, and the related device provided in the embodiments of the present invention may be further extended to other suitable implementation environments, and are not limited to the implementation environment shown in FIG. 1. Although only one vehicle diagnosis device 10, one communication device 20 and one vehicle 30 are shown in FIG. 1, a person skilled in the art can understand that in the actual application process, the application environment may further include more or fewer vehicle diagnosis devices 10, communication devices 20 and vehicles 30.

In addition, in this embodiment, the first physical interface 11 and the second physical interface 21 are both USB interfaces, and both the vehicle diagnosis device 10 and the communication device 20 include a USB communication mode and an IP communication mode. When the vehicle diagnosis device 10 and the communication device 20 are both in the USB communication mode, a USB communication link is formed between the vehicle diagnosis device 10 and the communication device 20; when the vehicle diagnosis device 10 and the communication device 20 are both in the IP communication mode, an IP communication link is formed between the vehicle diagnosis device 10 and the communication device 20. This is merely used for exemplary description, rather than limiting the embodiments of the present invention. In actual application, provided that the vehicle diagnosis device and the communication device each include at least the first communication mode and the second communication mode, a first communication link in the first communication mode or a second communication link in the second communication mode may be formed between the vehicle diagnosis device and the communication device based on a single physical link formed by the physical interface.

Embodiment 2

Figure 2:
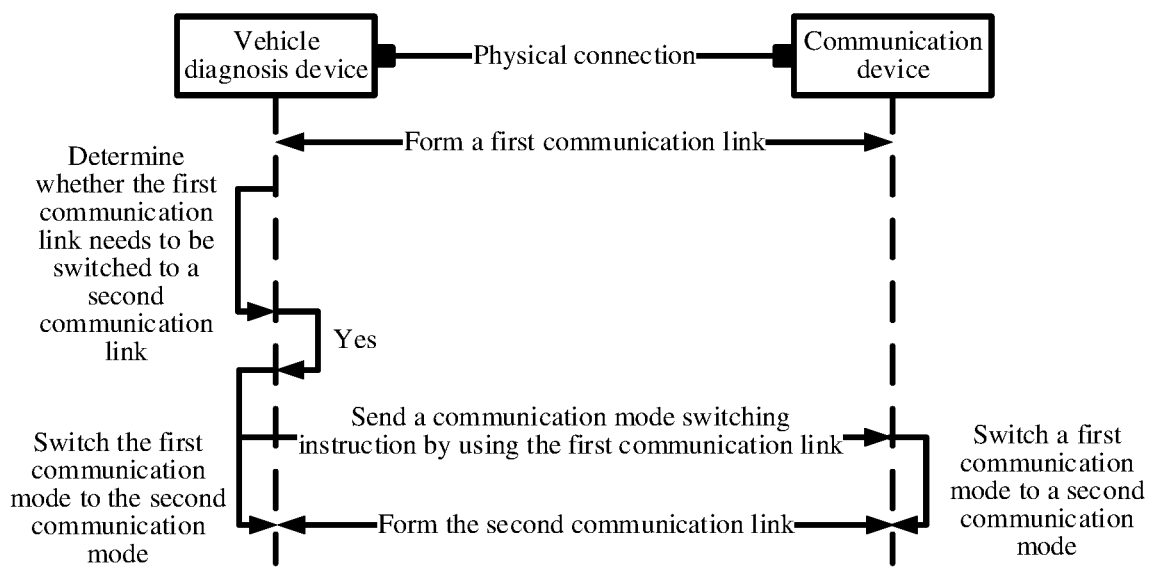
FIG. 2 is a first schematic interaction diagram of communication between a vehicle diagnosis device and a communication device according to an embodiment of the present invention.

FIG. 2 is a first schematic interaction diagram of communication between a vehicle diagnosis device and a communication device according to an embodiment of the present invention. Referring to FIG. 2, the communication method may include but not limited to the following steps:

Step 110: A first communication link is formed between a vehicle diagnosis device and a communication device based on connection by using a physical interface.

In this embodiment, the vehicle diagnosis device and the communication device each include a first communication mode and a second communication mode, and a first communication link or a second communication link may be formed between the vehicle diagnosis device and the communication device based on the connection by using the physical interface. When the vehicle diagnosis device and the communication device are both in the first communication mode, the first communication link is formed between the vehicle diagnosis device and the communication device; when the vehicle diagnosis device and the communication device are both in the second communication mode, the second communication link is formed between the vehicle diagnosis device and the communication device.

In actual application, it may be set that communication is performed between the vehicle diagnosis device and the communication device by using the first communication link by default. Specifically, a default communication mode of the vehicle diagnosis device and a default communication mode of the communication device are both set to the first communication mode. That is, in both the vehicle diagnosis device and the communication device, a physical interface thereof is driven by using a drive module corresponding to the first communication mode by default.

For example, assuming that the physical interface is a USB interface, and both the vehicle diagnosis device and the communication device include a USB communication mode and an IP communication mode, a USB communication link or an IP communication link may be formed between the vehicle diagnosis device and the communication device based on connection by using the USB interface. To reduce the probability of connection failure, the USB communication link may be selected as a default communication link. During specific implementation, the default communication mode of the vehicle diagnosis device and the default communication mode of the communication device may both be set to the USB communication mode, so that when physical connection is established between the vehicle diagnosis device and the communication device based on the physical interface, the USB communication link (that is, the first communication link) can be formed between the vehicle diagnosis device and the communication device.

Step 120: The vehicle diagnosis device determines whether the first communication link needs to be switched to the second communication link.

The first communication link and the second communication link are usually adapted to transmit different data. Therefore, in this embodiment, whether to perform communication by continuously using the first communication link or perform communication by switching to the second communication link may be determined according to a requirement.

Specifically, in one of the implementations, the vehicle diagnosis device may determine, according to a data volume of to-be-transmitted data, whether the first communication link needs to be switched to the second communication link. For example, generally, the data volume of conventional communication data such as simple instructions and messages is relatively small, and the communication between the vehicle diagnosis device and the communication device can be performed by using USB, WIFI, BT and other communication links. However, for some functions of the vehicle diagnosis device, such as ECU coding and programming, a transmission data volume thereof is relatively large, and data transmission usually needs to be performed by using the IP communication link. Assuming that the first communication link is the USB communication link, and the second communication link is the IP communication link, if a data volume of to-be-transmitted data (for example, a simple instruction or message) is relatively small (for example, the data volume is less than a preset threshold), the data transmission is performed by continuously using the USB communication link, and therefore, it may be determined that the communication link does not need to be switched; if a data volume of the to-be-transmitted data (for example, ECU coding, programming and other related data) is relatively large (for example, the data volume is greater than or equal to the preset threshold), the data transmission needs to be performed by using the IP communication link, and therefore, it may be determined that the USB communication link needs to be switched to the IP communication link.

In another implementation, the vehicle diagnosis device may also determine, according to an executed diagnosis function, whether the first communication link needs to be switched to the second communication link. For example, still using the USB communication link and the IP communication link as examples, if the executed diagnosis function is a conventional function, such as the function of fault scanning, data flow reading or action testing, the data transmission is performed by continuously using the USB communication link, and therefore, it may be determined that the communication link does not need to be switched; if the executed diagnosis function is a preset specific function, such as the function of ECU coding or programming, the data transmission needs to be performed by using the IP communication link, and therefore, it may be determined that the USB communication link needs to be switched to the IP communication link.

In still another implementation, the vehicle diagnosis device may further determine, according to a request inputted by a user, whether the first communication link needs to be switched to the second communication link. For example, in a process of communication between the vehicle diagnosis device and the communication device based on the first communication link, if the vehicle diagnosis device receives a request inputted by the user for switching the communication link, it is determined that the first communication link needs to be switched to the second communication link.

It should be understood that, in actual application, it may further be determined, by using any combination of the foregoing implementations, or any other suitable manner, whether the first communication link needs to be switched to the second communication link. Provided that it is determined that the first communication link needs to be switched to the second communication link, the following step 130 can be performed, and if the first communication link does not need to be switched to the second communication link, the communication is continuously performed based on the first communication link.

Step 130: The vehicle diagnosis device sends a communication mode switching instruction to the communication device by using the first communication link.

In this embodiment, to establish the second communication link, a current communication mode (that is, the first communication mode) of the vehicle diagnosis device needs to be switched to the second communication mode, and a current communication mode (that is, first communication mode) of the communication device is switched to the second communication mode. Therefore, when the vehicle diagnosis device determines that the first communication link needs to be switched to the second communication link, the communication mode switching instruction needs to be first sent to the communication device by using the first communication link, to instruct the communication device to switch the communication mode thereof from the first communication mode to the second communication mode.

Specifically, in actual application, when it is determined that the communication link needs to be switched, a communication mode switching instruction may be generated by a first communication management layer of the vehicle diagnosis device, and the communication mode switching instruction is encapsulated into transmission data of the first communication link, and then the transmission data is sent to a second communication management layer of the communication device by using the first communication link.

Step 140: The communication device switches the first communication mode to the second communication mode according to the mode switching instruction.

After the communication device receives, by using the first communication link, the communication mode switching instruction sent by the vehicle diagnosis device, the current communication mode (that is, the first communication mode) of the communication device may be switched to the second communication mode by using the second communication management layer of the communication device.

After the communication device switches the current communication mode thereof to the second communication mode, a second physical interface may be driven by using a drive module corresponding to the second communication mode, to establish the second communication link with the vehicle diagnosis device.

Step 150: The vehicle diagnosis device switches the first communication mode to the second communication mode, to establish the second communication link with the communication device.

In this embodiment, after sending the communication mode switching instruction to the communication device by using the first communication link, the vehicle diagnosis device may switch the first communication mode to the second communication mode, and drive the first physical interface by using the drive module corresponding to the second communication mode, to establish the second communication link with the communication device. In an implementation, the vehicle diagnosis device may monitor whether the first communication link is disconnected, and if the first communication link is disconnected, the vehicle diagnosis device switches the first communication mode to the second communication mode.

When the communication mode of the communication device is switched to the second communication mode, and the communication mode of the vehicle diagnosis device is switched to the second communication mode, the second communication link may be formed between the vehicle diagnosis device and the communication device.

In actual application, the communication device may fail to receive the communication mode switching instruction, or fail to switch the communication mode. In this case, if the vehicle diagnosis device directly switches the first communication mode to the second communication mode, on the one hand, the second communication link cannot be established, and on the other hand, because the first communication link is disconnected, feedback from the communication device cannot be obtained.

Therefore, to ensure the integrity and correctness of the communication link switching, in some embodiments, after the vehicle diagnosis device detects that the first communication link is disconnected (indicating that the communication device completes the communication mode switching), the first communication mode is switched to the second communication mode.

Alternatively, in some other embodiments, to avoid the loss of to-be-transmitted data, after switching the first communication mode to the second communication mode, the vehicle diagnosis device may alternatively send a test data packet to the communication device by using the second communication link according to a predetermined period. if a confirmation signal returned by the communication device is received, it indicates that the second communication link is formed between the vehicle diagnosis device and the communication device. In this case, the to-be-transmitted data may be sent by using the second communication link. If a confirmation signal returned by the communication device is not received, it indicates that the vehicle diagnosis device cannot communicate with the communication device. In this case, the to-be-transmitted data is not sent.

It can be learned from the foregoing technical solutions that this embodiment of the present invention has the following beneficial effects: according to the communication method provided in this embodiment of the present invention, a vehicle diagnosis device and a communication device are each provided with a first communication mode and a second communication mode; when the vehicle diagnosis device and the communication device are both in the first communication mode, a first communication link can be formed between the vehicle diagnosis device and the communication device based on connection by using a physical interface; when the vehicle diagnosis device and the communication device are both in the second communication mode, a second communication link can be formed between the vehicle diagnosis device and the communication device based on connection by using the same physical interface; and whether the communication is performed by using the first communication link or the second communication link can be determined according to a requirement; two communication links having different logics can be formed between the vehicle diagnosis device and the communication device based on a single physical connection manner, thereby reducing the quantity of physical interfaces, simplifying a hardware device, improving design efficiency and reducing production costs while meeting a requirement of communication between the vehicle diagnosis device and the communication device.

Embodiment 3

Figure 3:
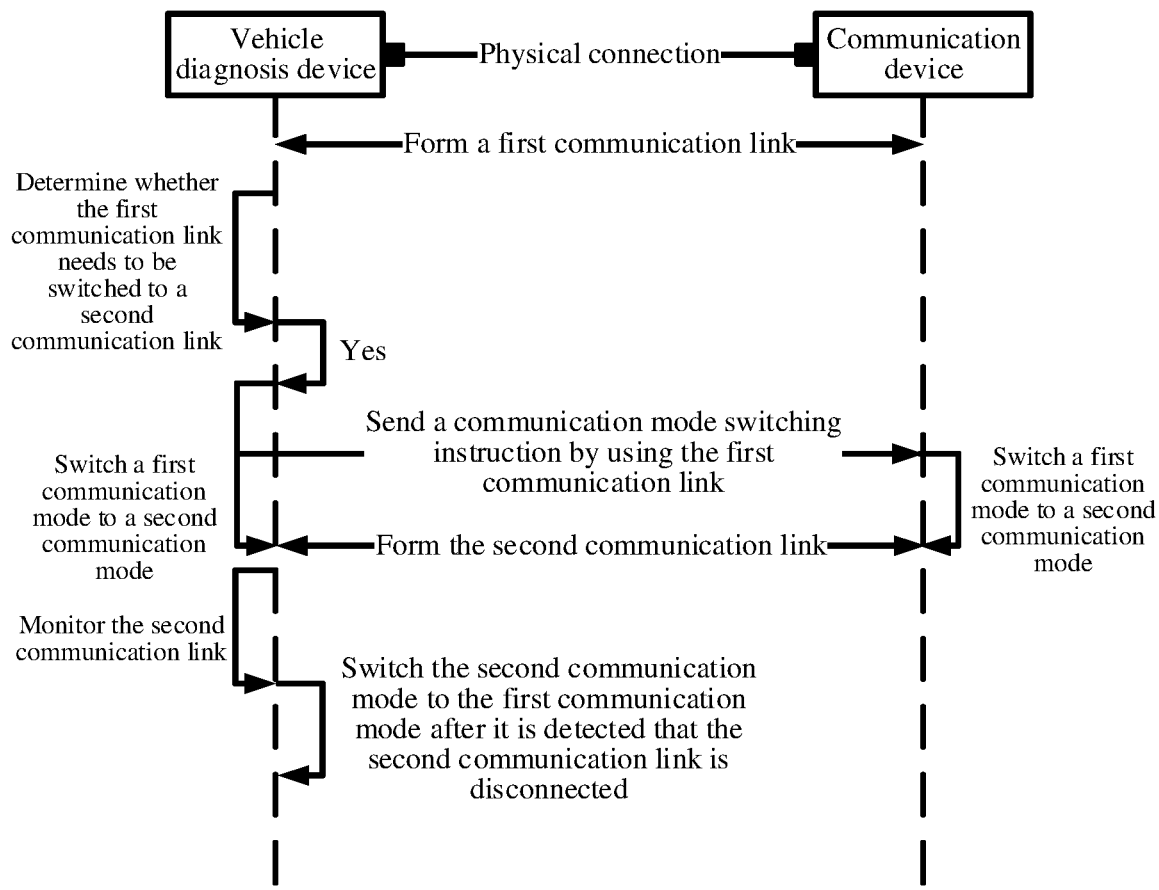
FIG. 3 is a second schematic interaction diagram of communication between a vehicle diagnosis device and a communication device according to an embodiment of the present invention.

Based on the foregoing Embodiment 2, the embodiments of the present invention further provide a second method for communication between a vehicle diagnosis device and a communication device. Specifically, as shown in FIG. 3, this embodiment is different from Embodiment 2 in that: in this embodiment, after the vehicle diagnosis device establishes the second communication link with the communication device, the method further includes:

Step 160: The vehicle diagnosis device monitors the second communication link.

In this embodiment, monitoring the second communication link refers to monitoring a connection status of the second communication link, and the connection status may include connection and disconnection.

Specifically, the vehicle diagnosis device may determine the connection status of the second communication link by regularly maintaining a chain handshake with the communication device by using the second communication link. For example, a query signal may be regularly generated by a first communication management layer of the vehicle diagnosis device, and is sent to the communication device by using the second communication link. If the communication device returns corresponding feedback, it indicates that a current second communication link is connected. In this case, communication may be continuously performed based on the second communication link. If the communication device does not return corresponding feedback, it indicates that the current second communication link is disconnected. In this case, the following step 170 may be performed.

Step 170: The vehicle diagnosis device switches the second communication mode to the first communication mode after detecting that the second communication link is disconnected.

In this embodiment, after the first communication management layer of the vehicle diagnosis device detects that the second communication link is disconnected, the second communication mode may be directly switched to the first communication mode to, to attempt to establish the first communication link and perform adjustment of the communication link in time.

Alternatively, in some other embodiments, after the first communication management layer of the vehicle diagnosis device detects that the second communication link is disconnected, a connection status of the second communication link may alternatively be first fed back to a diagnosis application layer, and the diagnosis application layer (or, a user) decides whether to switch the communication mode. If a decision result of the diagnosis application layer is "yes", then the first communication management layer switches the second communication mode to the first communication mode.

In this embodiment, the vehicle diagnosis device monitors the connection status of the second communication link in real time, and switches the second communication mode to the first communication mode after discovering that the second communication link is disconnected, so that the communication link can be adjusted in time, thereby ensuring the stability and reliability of the communication between vehicle diagnosis device and the communication device, and reducing a packet loss rate of data.

Embodiment 4

Figure 4:
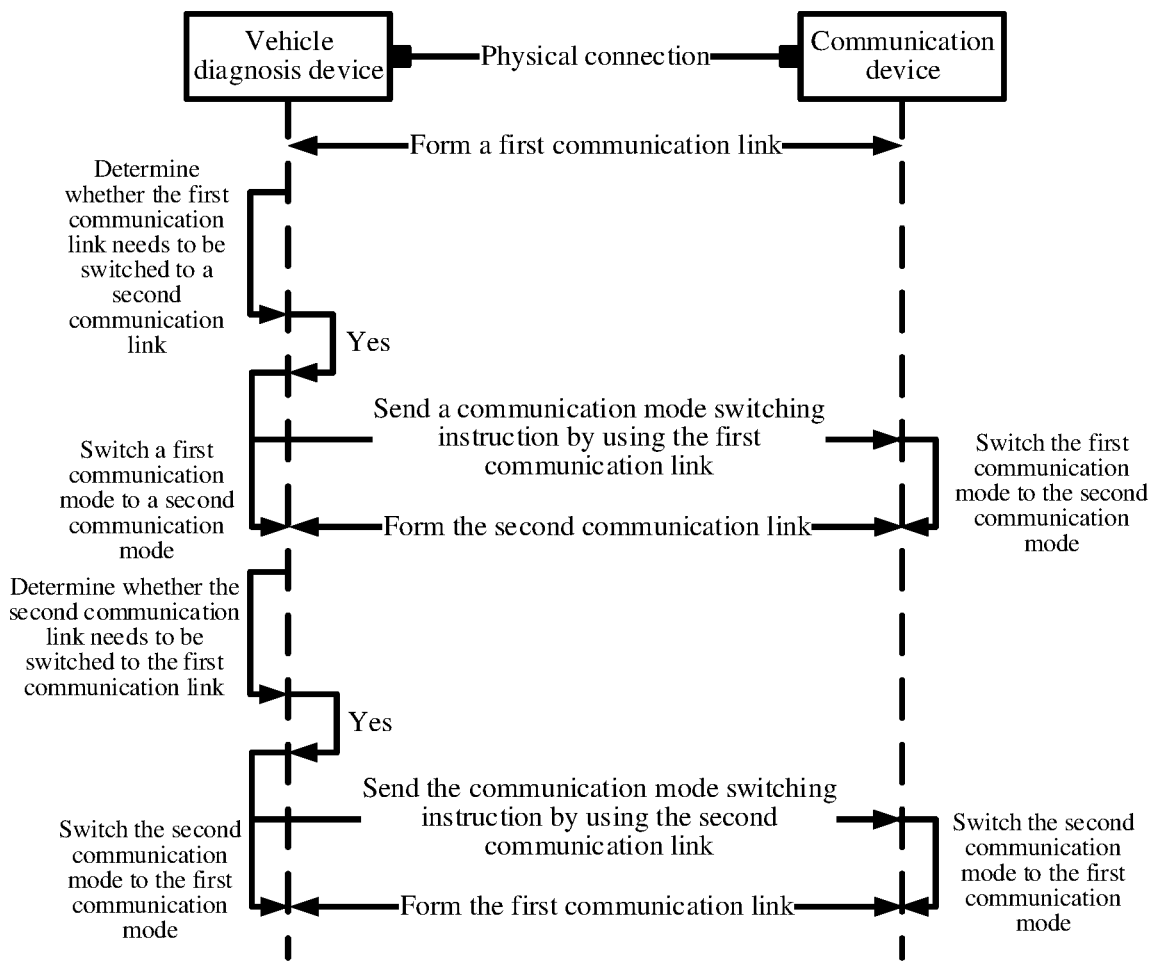
FIG. 4 is a third schematic interaction diagram of communication between a vehicle diagnosis device and a communication device according to an embodiment of the present invention.

Based on the foregoing Embodiment 2, the embodiments of the present invention further provide a third method for communication between a vehicle diagnosis device and a communication device. Specifically, as shown in FIG. 4, this embodiment is different from Embodiment 2 in that: in this embodiment, the communication method further includes:

Step 210: The vehicle diagnosis device determines whether the second communication link needs to be switched to the first communication link.

The vehicle diagnosis device may determine, according to factors such as a data volume of to-be-transmitted data, an executed diagnosis function, a request of a user, or completed data transmission, whether the second communication link needs to be switched to the first communication link.

Step 220: The vehicle diagnosis device sends the communication mode switching instruction to the communication device by using the second communication link.

The mode switching instruction is used to instruct the communication device to switch the current communication mode (that is, the second communication mode) to the first communication mode.

Step 230: The communication device switches the second communication mode to the first communication mode according to the mode switching instruction.

Step 240: The vehicle diagnosis device switches the second communication mode to the first communication mode, to establish the first communication link with the communication device.

It should be understood that the foregoing steps 210 to 240 have similar technical features to those of steps 120 to 150 in Embodiment 2. Therefore, for a specific implementation thereof, reference may be made to the corresponding descriptions in the foregoing Embodiment 2, and details are not described herein again.

In this embodiment, the vehicle diagnosis device may switch the second communication link back to the first communication link as required, to implement mutual switching between the communication links, so that whether the communication is performed with the communication device by using the first communication link or the second communication link can be determined according to a requirement, and the communication manner is more flexible.

Embodiment 5

Figure 5:
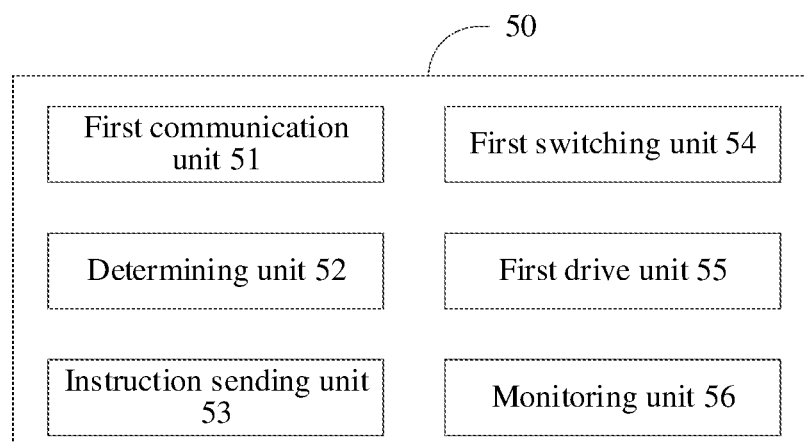
FIG. 5 is a schematic structural diagram of a communication apparatus applied to a vehicle diagnosis device according to an embodiment of the present invention.

FIG. 5 is a schematic structural diagram of a communication apparatus applied to a vehicle diagnosis device according to an embodiment of the present invention. The apparatus 50 may run on the vehicle diagnosis device. The vehicle diagnosis device is connected to a communication device by using a physical interface, the vehicle diagnosis device and the communication device each including a first communication mode and a second communication mode.

Specifically, referring to FIG. 5, the communication apparatus 50 includes a first communication unit 51, a determining unit 52, an instruction sending unit 53 and a first switching unit 54.

The first communication unit 51 is configured to form, based on the connection between the physical interface and the communication device, a first communication link in the first communication mode or a second communication link in the second communication mode with the communication device;

the determining unit 52 is configured to determine, after the first communication link is formed between the vehicle diagnosis device and the communication device, whether the first communication link needs to be switched to the second communication link;

the instruction sending unit 53 is configured to send a communication mode switching instruction to the communication device by using the first communication link when the determining unit 52 determines that the first communication link needs to be switched to the second communication link, to enable the communication device to switch the first communication mode of the communication device to the second communication mode; and the first switching unit 54 is configured to switch the first communication mode to the second communication mode after the instruction sending unit 53 sends the communication mode switching instruction to the communication device by using the first communication link, to establish the second communication link with the communication device.

Specifically, in this embodiment, the first communication link in the first communication mode or the second communication link in the second communication mode may be formed with the communication device based on the connection between the physical interface and the communication device by using the first communication unit 51. After the first communication link is formed between the vehicle diagnosis device and the communication device, whether the first communication link needs to be switched to the second communication link is determined by the determining unit 52; if the first communication link needs to be switched to the second communication link, the instruction sending unit 53 sends a communication mode switching instruction to the communication device by using the first communication link, to enable the communication device to switch the first communication mode of the communication device to the second communication mode, thereby switching the first communication mode to the second communication mode by using the first switching unit 54, to establish the second communication link with the communication device.

In some embodiments, the determining unit 52 is specifically configured to: determine, according to a data volume of to-be-transmitted data, whether the first communication link needs to be switched to the second communication link. Alternatively, in some other embodiments, the determining unit 52 is specifically configured to: determine, according to an executed diagnosis function, whether the first communication link needs to be switched to the second communication link.

In some embodiments, the first switching unit 54 is specifically configured to: switch the first communication mode to the second communication mode after it is detected that the first communication link is disconnected.

In some embodiments, the communication apparatus 50 further includes: a first drive unit 55, configured to establish the second communication link with the communication device by using a drive module corresponding to the second communication mode.

In some embodiments, the communication apparatus 50 further includes: a monitoring unit 56, configured to monitor the second communication link. In this embodiment, the first switching unit 54 is further configured to: switch the second communication mode to the first communication mode after the monitoring unit 56 detects that the second communication link is disconnected.

Figure 6:
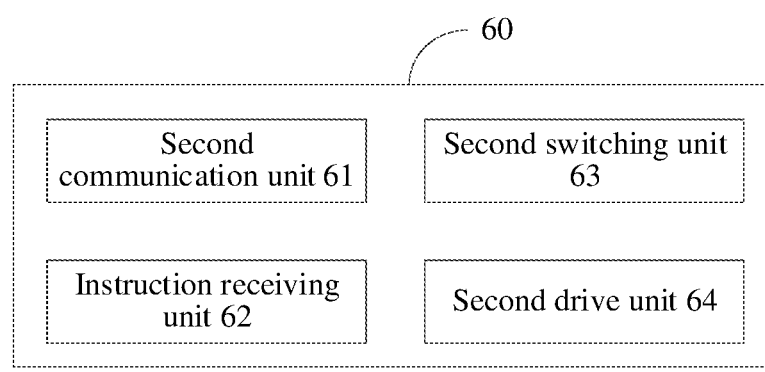
FIG. 6 is a schematic structural diagram of a communication apparatus applied to a communication device according to an embodiment of the present invention.

FIG. 6 is a schematic structural diagram of a communication apparatus applied to a communication device according to an embodiment of the present invention. The communication apparatus 60 may run on the communication device. The communication device is connected to a vehicle diagnosis device by using a physical interface. The communication device and the vehicle diagnosis device each include a first communication mode and a second communication mode.

Specifically, referring to FIG. 6, the communication apparatus 60 includes a second communication unit 61, an instruction receiving unit 62 and a second switching unit 63.

The second communication unit 61 is configured to form, based on the connection between the physical interface and the vehicle diagnosis device, a first communication link in the first communication mode or a second communication link in the second communication mode with the vehicle diagnosis device;

the instruction receiving unit 62 is configured to receive, by using the first communication link, after the first communication link is formed between the communication device and the vehicle diagnosis device, a communication mode switching instruction sent by the vehicle diagnosis device; and the second switching unit 63 is configured to switch the first communication mode to the second communication mode when the instruction receiving unit 62 receives the communication mode switching instruction, to establish the second communication link with the vehicle diagnosis device.

Specifically, in this embodiment, a first communication link in the first communication mode or a second communication link in the second communication mode may be formed with the vehicle diagnosis device by using the second communication unit 61 based on the connection between the physical interface and the vehicle diagnosis device. After the first communication link is formed between the communication device and the vehicle diagnosis device, if the instruction receiving unit 62 receives, by using the first communication link, a communication mode switching instruction sent by the vehicle diagnosis device, the first communication mode is switched to the second communication mode by using the second switching unit 63, to establish the second communication link with the vehicle diagnosis device.

In some embodiments, the communication apparatus 60 further includes: a second drive unit 64, configured to establish the second communication link with the vehicle diagnosis device by using a drive module corresponding to the second communication mode.

In addition, it should be noted that, because the communication apparatuses (50 and 60) described above and the communication method described in the foregoing embodiments are based on the same inventive concept, the corresponding content and beneficial effects in the foregoing method embodiments are also applicable to this apparatus embodiment, and details are not described herein again.

Embodiment 6

Figure 7:
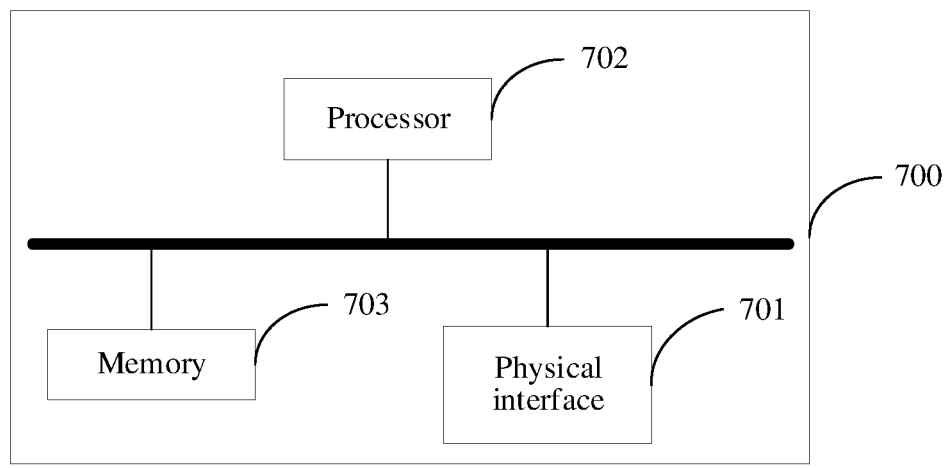
FIG. 7 is a schematic structural diagram of hardware of a vehicle diagnosis device according to an embodiment of the present invention.

FIG. 7 is a schematic structural diagram of hardware of a vehicle diagnosis device according to an embodiment of the present invention. The vehicle diagnosis device 700 may be any type of electronic device, such as a tablet computer, or a diagnose robot.

Specifically, referring to FIG. 7, the vehicle diagnosis device 700 includes:

a physical interface 701, one or more processors 702 and a memory 703. One processor 702 is used as an example in FIG. 7.

The physical interface 701, the processor 702 and the memory 703 may be connected by using a bus or in other manners. Connection by using a bus is used as an example in FIG. 7.

The memory 703, as a non-transitory computer-readable storage medium, may be configured to store a non-transitory software program, a non-transitory computer executable program and a module (such as the first communication unit 51, the determining unit 52, the instruction sending unit 53, the first switching unit 54, the first drive unit 55 and the monitoring unit 56 shown in FIG. 5). The processor 702 runs the non-transitory software program, the instructions and the module stored in the memory 703, to implement the communication method applied to the vehicle diagnosis device in any of the foregoing method embodiments.

The memory 703 may include a program storage area and a data storage area. The program storage area may store an operating system and an application program required by at least one function, for example, a diagnose software program. The data storage area may store data created according to use of the communication apparatus 50, and the like. In addition, the memory 703 may include a high-speed random access memory, and may further include a non-transitory memory, such as at least one magnetic disk storage device, a flash storage device or other non-transitory solid-state storage devices. In some embodiments, the memory 703 optionally includes memories remotely disposed relative to the processor 702, and these remote memories may be connected to the processor 702 by using a network. Examples of the foregoing network include, but not limited to, the Internet, an intranet, a local area network, a mobile communication network and a combination thereof.

The memory 703 stores instructions that can be executed by the at least one processor 702; the at least one processor 702 is configured to execute the instructions, to implement the communication method applied to the vehicle diagnosis device in any of the foregoing method embodiments, for example, perform the foregoing described method steps 110, 120, 130, 150, 160, 170, 210, 220, and 240.

Further, the embodiments of the present invention further provide a non-transitory computer-readable storage medium, the non-transitory computer-readable storage medium storing computer executable instructions, and the computer executable instructions being executed by one or more processors, for example, one processor 702 shown in FIG. 7, so that the one or more processors 702 perform the communication method applied to the vehicle diagnosis device in any of the foregoing method embodiments, for example, perform the foregoing described method steps 110, 120, 130, 150, 160, 170, 210, 220 and 240.

Embodiment 7

Figure 8:
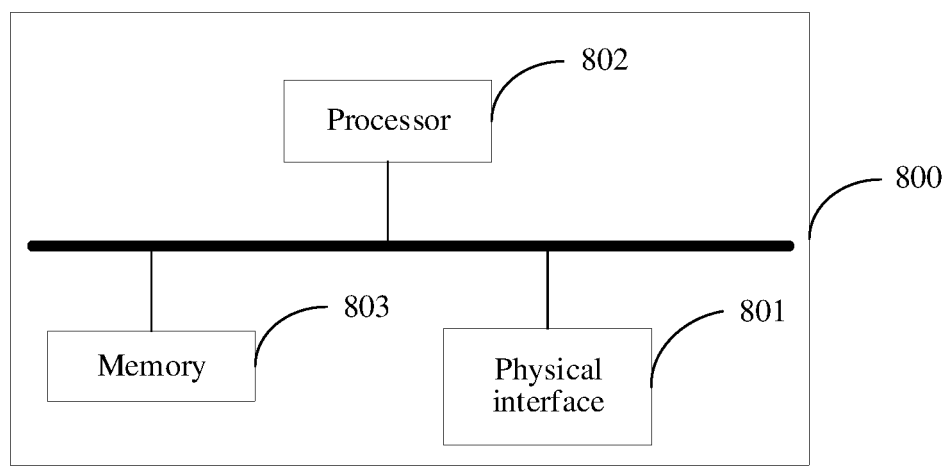
FIG. 8 is a schematic structural diagram of hardware of a communication device according to an embodiment of the present invention.

FIG. 8 is a schematic structural diagram of hardware of a communication device according to an embodiment of the present invention. The communication device 800 may be any type of communication box, such as a VCI, an OBD, or the like.

Specifically, referring to FIG. 8, the vehicle diagnosis device 800 includes:

a physical interface 801, one or more processors 802 and a memory 803. One processor 802 is used as an example in FIG. 8.

The physical interface 801, the processor 802 and the memory 803 may be connected by using a bus or in other manners. Connection by using a bus is used as an example in FIG. 8.

The memory 803, as a non-transitory computer-readable storage medium, may be configured to store a non-transitory software program, a non-transitory computer executable program and a module (such as the second communication unit 61, the instruction receiving unit 62, the second switching unit 63 and the second drive unit 64 shown in FIG. 6). The processor 802 runs the non-transitory software program, the instructions and the module stored in the memory 803, to implement the communication method applied to the communication device in any of the foregoing method embodiments.

The memory 803 may include a program storage area and a data storage area. The program storage area may store an operating system and an application program required by at least one function, for example, a diagnose software program. The data storage area may store data created according to use of the communication apparatus 60, and the like. In addition, the memory 803 may include a high-speed random access memory, and may further include a non-transitory memory, such as at least one magnetic disk storage device, a flash storage device, or other non-transitory solid-state storage devices. In some embodiments, the memory 803 optionally includes memories remotely disposed relative to the processor 802, and these remote memories may be connected to the processor 802 by using a network. Examples of the foregoing network include, but not limited to, the Internet, an intranet, a local area network, a mobile communication network and a combination thereof.

The memory 803 stores instructions that can be executed by the at least one processor 802; the at least one processor 802 is configured to execute the instructions, to implement the communication method applied to the communication device in any of the foregoing method embodiments, for example, perform the foregoing described method steps 110, 140 and 230.

Further, the embodiments of the present invention further provide a non-transitory computer-readable storage medium, the non-transitory computer-readable storage medium storing computer executable instructions, and the computer executable instructions being executed by one or more processors, for example, one processor 802 in FIG. 8, so that the foregoing one or more processors 802 perform the communication method applied to the communication device in any of the foregoing method embodiments, for example, perform the foregoing described method steps 110, 140 and 230.

The foregoing described apparatus embodiments are merely examples. The units described as separate parts may or may not be physically separated, and the parts displayed as units may or may not be physical units, may be located in one position, or may be distributed on a plurality of network units. Some or all of the modules may be selected according to actual needs to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a related device, the related device may be enabled to execute the procedures of the foregoing method embodiments. The storage medium may be a magnetic disk, an optical disc, a read-only memory (ROM), or a random access memory (RAM).

The foregoing product may perform the communication method provided in the embodiments of the present invention, and includes corresponding functional modules for performing the communication method and beneficial effects. For technical details not described in detail in this embodiment, reference may be made to the communication method provided in the embodiments of the present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A communication method, applied to a vehicle diagnosis device, wherein the vehicle diagnosis device is connected to a communication device by using a physical interface, wherein the communication device is communicatively connected to the vehicle diagnosis device and the vehicle, the vehicle diagnosis device and the communication device each comprising a first communication mode and a second communication mode, and the method comprises:
forming, based on the connection between the physical interface and the communication device, a first communication link in the first communication mode or a second communication link in the second communication mode with the communication device;
determining, after the first communication link is formed between the vehicle diagnosis device and the communication device, whether the first communication link needs to be switched to the second communication link;
in respond to the first communication link needs to be switched to the second communication link,
sending a communication mode switching instruction to the communication device by using the first communication link, to enable the communication device to switch the first communication mode of the communication device to the second communication mode; and
switching the first communication mode to the second communication mode to establish the second communication link with the communication device;
wherein the method further comprises:
establishing the second communication link with the communication device by using a drive module corresponding to the second communication mode;
wherein the determining whether the first communication link needs to be switched to the second communication link comprises:
determining, according to a data volume of to-be-transmitted data, whether the first communication link needs to be switched to the second communication link; or,
determining, according to an executed diagnosis function, whether the first communication link needs to be switched to the second communication link;
wherein after the vehicle diagnosis device establishes the second communication link with the communication device, the method further comprises:
monitoring the second communication link; and
switching the second communication mode to the first communication mode after it is detected that the second communication link is disconnected.

2. The method according to claim 1, wherein the switching the first communication mode to the second communication mode comprises:
switching the first communication mode to the second communication mode after it is detected that the first communication link is disconnected.

3. A communication method, applied to a communication device, wherein the communication device is connected to a vehicle diagnosis device by using a physical interface, the communication device and the vehicle diagnosis device each comprising a first communication mode and a second communication mode, and the method comprises:
forming, based on the connection between the physical interface and the vehicle diagnosis device, a first communication link in the first communication mode or a second communication link in the second communication mode with the vehicle diagnosis device; and
after the first communication link is formed between the communication device and the vehicle diagnosis device, if a communication mode switching instruction sent by the vehicle diagnosis device is received by using the first communication link, switching the first communication mode to the second communication mode to establish the second communication link with the vehicle diagnosis device;
further comprising:
establishing the second communication link with the vehicle diagnosis device by using a drive module corresponding to the second communication mode.

4. A communication apparatus, applied to a vehicle diagnosis device, wherein the vehicle diagnosis device is connected to a communication device by using a physical interface, the vehicle diagnosis device and the communication device each comprising a first communication mode and a second communication mode, and the apparatus comprises a first communication unit, a determining unit, an instruction sending unit and a first switching unit;

the first communication unit is configured to form, based on the connection between the physical interface and the communication device, a first communication link in the first communication mode or a second communication link in the second communication mode with the communication device;

the determining unit is configured to determine, after the first communication link is formed between the vehicle diagnosis device and the communication device, whether the first communication link needs to be switched to the second communication link;

the instruction sending unit is configured to send a communication mode switching instruction to the communication device by using the first communication link when the determining unit determines that the first communication link needs to be switched to the second communication link, to enable the communication device to switch the first communication mode of the communication device to the second communication mode; and the first switching unit is configured to switch the first communication mode to the second communication mode after the instruction sending unit sends the communication mode switching instruction to the communication device by using the first communication link, to establish the second communication link with the communication device;

further comprising:

a first drive unit, configured to establish the second communication link with the communication device by using a drive module corresponding to the second communication mode;

wherein the determining unit is specifically configured to:

determine, according to a data volume of to-be-transmitted data, whether the first communication link needs to be switched to the second communication link; or, determine, according to an executed diagnosis function, whether the first communication link needs to be switched to the second communication link;

further comprising a monitoring unit, the monitoring unit being configured to monitor the second communication link; and the first switching unit is further configured to: switch the second communication mode to the first communication mode after the monitoring unit detects that the second communication link is disconnected.

5. The apparatus according to claim 4, wherein the first switching unit is specifically configured to:

switch the first communication mode to the second communication mode after it is detected that the first communication link is disconnected.

* * * * *